(12) United States Patent
Dowdell et al.

(10) Patent No.: US 9,494,082 B2
(45) Date of Patent: Nov. 15, 2016

(54) ELECTRICAL CONNECTORS

(71) Applicant: ROLLS-ROYCE PLC, London (GB)

(72) Inventors: David Dowdell, Diss (GB); Matthew Peter Fitt, Attleborough (GB)

(73) Assignee: ROLLS-ROYCE plc, London (GB)

( * ) Notice: Subject to any disclaimer, the term of this patent is extended or adjusted under 35 U.S.C. 154(b) by 414 days.

(21) Appl. No.: 14/230,335

(22) Filed: Mar. 31, 2014

(65) Prior Publication Data
US 2014/0325994 A1    Nov. 6, 2014

(30) Foreign Application Priority Data

May 3, 2013    (GB) .................................... 1308025.4

(51) Int. Cl.
| | | |
|---|---|---|
| F02C 6/00 | (2006.01) | |
| F02C 7/32 | (2006.01) | |
| H01R 12/77 | (2011.01) | |
| H01R 13/52 | (2006.01) | |
| F02C 9/00 | (2006.01) | |
| F02C 7/00 | (2006.01) | |

(52) U.S. Cl.
CPC . *F02C 7/32* (2013.01); *F02C 7/00* (2013.01); *F02C 9/00* (2013.01); *H01R 12/77* (2013.01); *H01R 13/52* (2013.01); *F05D 2240/91* (2013.01); *Y02T 50/672* (2013.01); *Y10T 29/49117* (2015.01)

(58) Field of Classification Search
USPC .................. 60/801, 721; 439/527, 542, 569; 29/825, 854, 857, 874
See application file for complete search history.

(56) References Cited

U.S. PATENT DOCUMENTS

| | | | |
|---|---|---|---|
| 5,805,402 A | 9/1998 | Maue et al. | |
| 2006/0148312 A1* | 7/2006 | Huang | H01R 13/025 439/527 |
| 2011/0250787 A1* | 10/2011 | Kan | H01R 13/501 439/527 |
| 2012/0315773 A1 | 12/2012 | Esquivel et al. | |

(Continued)

FOREIGN PATENT DOCUMENTS

EP    1 762 714 A2    3/2007

OTHER PUBLICATIONS

Jul. 25, 2014 European Search Report issued in European Application No. 14162572.

(Continued)

*Primary Examiner* — Jacob K Ackun
(74) *Attorney, Agent, or Firm* — Oliff PLC

(57) ABSTRACT

An electrical raft is provided comprising a rigid material having multiple electrical conductors embedded therein. An electrical connector is provided to the raft that has a back-shell which is embedded in the rigid material and which joins to a connector body to enclose a first end of a housing of the connector body. The housing also has a second end at which electrical contacts are provided for connection to another component. The connector body is detachable from the back-shell to electrically disconnect it from the embedded electrical conductors and allow removal of the connector body from the electrical raft. In this way, the connector body may be readily removed, for example for upgrade or repair, while retaining a robust and reliable connection.

10 Claims, 9 Drawing Sheets

(56) References Cited

U.S. PATENT DOCUMENTS

| | | | |
|---|---|---|---|
| 2012/0328919 A1* | 12/2012 | Laderer | H01M 10/482 429/90 |
| 2013/0170957 A1* | 7/2013 | Farnsworth | H01R 13/502 415/121.3 |
| 2014/0141644 A1* | 5/2014 | Casse | H02G 3/02 439/527 |
| 2014/0306560 A1* | 10/2014 | Hochstetler | H02K 5/225 310/71 |
| 2016/0069213 A1* | 3/2016 | Fitt | F01D 25/24 415/121.3 |

OTHER PUBLICATIONS

Oct. 28, 2013 British Search Report issued in British Application No. 1308025.4.

* cited by examiner

ELECTRICAL CONNECTORS

CROSS-REFERENCE TO RELATED APPLICATIONS

This application is based upon and claims the benefit of priority from British Patent Application Number 1308025.4 filed 3 May 2013, the entire contents of which is incorporated by reference.

BACKGROUND OF THE INVENTION

1. Field of the Disclosure

The present disclosure relates to electrical connectors. In particular, aspects of the disclosure relate to electrical connectors in rigid electrical rafts used to distribute electrical signals around a gas turbine engine.

2. Description of the Related Art

A typical gas turbine engine has a substantial number of electrical components which serve, for example, to sense operating parameters of the engine and/or to control actuators which operate devices in the engine. Such devices may, for example, control fuel flow, variable vanes and air bleed valves. The actuators may themselves be electrically powered, although some may be pneumatically or hydraulically powered, but controlled by electrical signals.

Electrical power, and signals to and from the individual electrical components, is commonly transmitted along conductors. Conventionally, such conductors may be in the form of wires and/or cables which are assembled together in a harness. In such a conventional harness, each wire may be surrounded by an insulating sleeve, which may be braided or have a braided cover.

By way of example, FIG. 1 of the accompanying drawings shows a typical gas turbine engine including two conventional wiring harnesses 102, 104, each provided with a respective connector component 106, 108 for connection to circuitry, which may be for example accommodated within the airframe of an aircraft in which the engine is installed.

The harnesses 102, 104 are assembled from individual wires and cables which are held together over at least part of their lengths by suitable sleeving and/or braiding. Individual wires and cables, for example those indicated at 110, emerge from the sleeving or braiding to terminate at plug or socket connector components 112 for cooperation with complementary socket or plug connector components 114 on, or connected to, the respective electrical components.

Each conventional harness 102, 104 comprises a multitude of insulated wires and cables. This makes the conventional harness itself bulky, heavy and difficult to manipulate. The conventional harnesses occupy significant space within a gas turbine engine (for example within the nacelle of a gas turbine engine), and thus may compromise the design of the aircraft, for example the size and/or weight and/or shape of the nacelle.

Conventional harnesses comprise a large number of components, including various individual wires and/or bundles of wires, supporting components (such as brackets or cables) and electrical and/or mechanical connectors. This can make the assembly process complicated (and thus susceptible to errors) and/or time consuming. Disassembly of the conventional harnesses (for example removal of the conventional harnesses from a gas turbine engine during maintenance) may also be complicated and/or time consuming. Thus, in many maintenance (or repair or overhaul) procedures on a gas turbine engine, removal and subsequent refitting of the conventional electrical harness may account for a very significant portion of the operation time and/or account for a significant proportion of the potential assembly errors.

The electrical conductors in the conventional harnesses may be susceptible to mechanical damage. For example, mechanical damage may occur during installation (for example through accidental piercing of the protective sleeves/braiding) and/or during service (for example due to vibration). In order to reduce the likelihood of damage to the conductors in a conventional harness, the protective sleeves/braiding may need to be further reinforced, adding still further weight and reducing the ease with which they can be manipulated. Similarly, the exposed electrical connectors used to connect one conductor to another conductor or conductors to electrical units may be susceptible to damage and/or may add significant weight to the engine.

OBJECTS AND SUMMARY

In a first aspect, the present invention provides an electrical raft comprising:
- a rigid material having multiple electrical conductors embedded therein, and
- an electrical connector having a connector body including a first set of electrical contacts connected to at least one of the electrical conductors, a second set of electrical contacts for electrical connection to another component, and a housing having a first end and a second end, the first set of electrical contacts being at the first end, the second set of electrical contacts being at the second end, and the second end being accessible from outside the electrical raft, thereby allowing the electrical raft to be electrically connected to said other component;

wherein:
- the electrical connector further has a back-shell which is embedded in the rigid material and which joins to the connector body to enclose the first end of the housing, and
- the connector body is detachable from the back-shell to disconnect the first set of electrical contacts from the electrical conductors and allow removal of the connector body from the electrical raft.

By embedding the back-shell of the connector in the rigid material of the raft, it is possible to integrate this part of the connector with the raft. Because the back-shell may be assembled with the raft, its position, and hence the position of the connector, can be determined accurately, reducing error during connection to other units. In addition, the connector body, being detachable from the back-shell to allow removal of the connector body from the raft, facilitates replacement, repair or upgrading of the connector body.

The housing may be a convenient arrangement for providing the second set of electrical contacts in a position that allows them to be connectable to another component, and the first set of electrical contacts at a position that allows them to be connected to one or more of the embedded electrical conductors. The housing may provide protection to the internal parts of the connector (which may, for example, include components for electrically connecting the first set of electrical contacts with the second set of electrical contacts).

In a second aspect, the present invention provides an electrical raft assembly comprising: an electrical raft according to any example of the first aspect, and a further electrical component comprising a complimentary set of electrical contacts that correspond to the second set of electrical contacts, wherein the electrical raft and the further electrical component are in electrical connection through the second set of electrical contacts and the complimentary set of electrical contacts.

The complimentary set of electrical contacts may be in the form of a plug or socket. The second set of electrical contacts of the electrical raft may thus be in the form of the other of a plug and socket. The further electrical component may be any sort of electrical component, for example a set of electrical conductors that link the electrical raft to a still further electrical component. Such a set of electrical conductors may be, for example, in the form of one or more wires, which may be bundled together and/or which may be sheathed/braided, and/or in the form of an FPC. Additionally or alternatively, the further electrical component may be, for example, an electrical unit. Such an electrical unit may be mechanically fixed/mounted to the surface of the electrical raft. The mechanical fixing may be independent of the electrical connection.

In a third aspect, the present invention provides a gas turbine engine or gas turbine engine installation, having the raft according to the first aspect or the raft assembly of the second aspect. For example, the electrical rigid raft or electrical raft assembly may be a first engine installation component, and the gas turbine engine or gas turbine engine installation may further comprise a second engine installation component having electrical conductors. At least one flexible cable can then connect between the electrical raft or electrical raft assembly and the second engine installation component so as to electrically connect electrical conductors of the electrical raft or electrical raft assembly with electrical conductors of the second engine installation component.

In a fourth aspect, the present invention provides a method of manufacturing (including assembling, repairing, reassembling and/or overhauling) a gas turbine engine comprising: attaching an electrical raft according to the first aspect (or an electrical raft assembly according to the second aspect) to the engine, and electrically connecting a further electrical component of the gas turbine engine to the electrical raft (or electrical raft assembly) by connecting the second set of contacts to a complimentary set of contacts of the further electrical component. The further electrical component may be as described elsewhere herein, for example a flexible cable (such as a FPC), or an ECU, such as en electronic engine controller (EEC), or Engine Health Monitoring Unit (EMU).

Further optional features of the invention will now be set out. These are applicable singly or in any combination with any aspect of the invention.

The rigid material may be a rigid polymer matrix composite material. The back-shell can advantageously prevent ingress of the polymer as a fouling contaminant into the connector during manufacture of the raft. During manufacture, such contaminants can interfere with the positions of the electrical contacts, whereby the mated contacts may be unable to move sufficiently to ensure good electrical contact. During use, such contaminants can interfere with the proper electrical functioning of the connector, e.g. by preventing electrical contacts or producing short-circuits.

The rigid material may contain layers of continuous reinforcing fibres, as discussed below.

The electrical connector may have an elastomeric seal between the housing and the back-shell. Such a seal can be particularly effective at preventing ingress of polymer during manufacture. Indeed, it is particularly desirable to prevent any such ingress when a seal is used, as ingressing polymer can reduce compliance at the seal, reducing sealing effectiveness and allowing other contaminants (e.g. oil or fuel) to enter the connector during use.

The connector body may be joined to the back-shell by fasteners, such as bolts, that are accessible from outside the electrical raft.

The back-shell may have one or more location formations that prevent movement of the back-shell relative to the rigid material. For example, the back-shell may have a flange that retains the back-shell in the rigid material and presents the connector at a correct orientation relative to a major surface of the raft from which the connector body is removable, and/or one or more flats, keyways or other shaped formations which prevent rotation of the back-shell in the rigid material.

The housing and the back-shell may be electrically conductive and may be in electrical contact with each other to provide electro-magnetic shielding of the connector. For example, the housing and the back-shell can be formed of metal. However another option is to form the housing and the back-shell of conductive or plated composite, plastic or ceramic, which may provide weight advantages.

At least some of the electrical conductors embedded in the electrical raft may be electrical wires. The electrical wires may be provided with a protective and/or insulating sheath/braiding. As such, individual wires may be laid into (or embedded in) the electrical raft, and each wire may be used to transfer one or more electrical signals through the raft and around an engine.

At least some of the electrical conductors may be provided in a flexible printed circuit (FPC) in the form of electrical tracks formed in a flexible substrate. The electrical tracks may then terminate in openings in a flexible printed circuit connector. The FPC may be provided with a dedicated connector to connect the electrical tracks to the electrical connector. The electrical tracks may terminate in conductive openings in such a dedicated connector. Such a dedicated connector may be referred to as a lollipop connector, and may be generally planar. The first set of electrical contacts may comprise pins that are received in respective openings so as to electrically connect the electrical tracks to the electrical connector. This may be a particularly compact and/or lightweight and/or robust arrangement for connecting electrical tracks in an embedded flexible printed circuit to the electrical connector. Further, a pin and opening connection arrangement can be a convenient way disconnectably connecting the first set of electrical contacts to the electrical conductors, as the pins can simply be withdrawn from the openings, and re-inserted as necessary.

Any given electrical raft may be provided with one or more electrical wires embedded therein (which may be sheathed) and/or one or more flexible printed circuits embedded therein. As such, a given electrical raft may have wires and flexible printed circuits laid therein.

The electrical raft may have a first major surface from which the connector body is removable. The electrical raft may have a second major surface which is separated by a thickness from the first major surface. The second major surface may be substantially parallel to the first major surface. The electrical conductors embedded in the raft may generally extend in a direction that is substantially parallel to the first and/or second major surface.

The electrical raft may comprise an earthing (or grounding) mesh. The earthing mesh may be referred to as an electrically conductive screen layer, and may or may not take the form of a mesh. The earthing mesh may provide electrical screening to the electrical conductors embedded in the raft. For example, the earthing mesh may provide electrical screening against electrical interference and/or from electrical surges, for example from lightning strikes. The earthing mesh may be grounded, for example to a gas turbine engine to which the electrical raft may be provided. The earthing mesh may take any suitable form/arrangement. For example, it may be a mesh-type construction (meaning that it may be a surface with holes provided therein) and/or may be metallic. The earthing mesh may be embedded in the rigid material (for example it may be provided during manufacture). Alternatively or additionally, a fixture may be provided to hold the earthing mesh in position.

The earthing mesh may be connected (electrically and/or mechanically) to a back-shell location formation, where both are present.

In general, the use of one or more electrical rafts/electrical raft assemblies may significantly reduce build time of an engine. For example, use of electrical rafts/electrical raft assemblies may significantly reduce the part count involved in engine assembly compared with a conventional harness arrangement. The number and/or complexity of the operations required to assemble an engine (for example to assemble/install the electrical system (or network) and/or other peripheral components, which may be referred to in general as engine dressing) may be reduced. For example, rather than having to install/assemble a great number of wires and/or wiring looms together on the engine installation, it may only be necessary to attach a relatively small number of electrical rafts/electrical raft assemblies, which themselves may be straightforward to handle, position, secure and connect. Thus, use of electrical raft assemblies in a gas turbine installation may reduce assembly time and/or reduce the possibility of errors occurring during assembly.

Use of electrical raft assemblies may provide significant advantages during maintenance, such as repair and overhaul. As discussed above, the electrical rafts may be particularly quick and straightforward to assemble. The same advantages discussed above in relation to assembly apply to disassembly/removal from the gas turbine engine. Thus, any repair/overhaul that requires removal of at least a part of the electrical harness may be simplified and/or speeded up through use of electrical rafts as at least a part of the electrical harness, for example compared with conventional harnesses. Use of electrical rafts (for example as part of one or more electrical raft assemblies) may allow maintenance procedures to be advantageously adapted. For example, some maintenance procedures may only require access to a certain portion of the gas turbine engine that only requires a part of the harness to be removed. It may be difficult and/or time consuming, or not even possible, to only remove the required part of a conventional harness from a gas turbine engine. However, it may be relatively straightforward to only remove the relevant electrical raft, for example by simply disconnecting it from the engine and any other electrical rafts/components to which it is connected. Decreasing maintenance times has the advantage of, for example, reducing out-of service times (for example off-wing times for engines that are used on aircraft).

The build/assembly times may be additionally or alternatively reduced by pre-assembling and/or pre-testing individual and/or combinations of electrical rafts and/or electrical raft assemblies prior to engine assembly. This may allow the electrical and/or mechanical operation of the electrical rafts to be proven before installation, thereby reducing/eliminating the testing required during engine installation.

The electrical rafts/electrical raft assemblies may be a particularly lightweight solution for transferring electrical signals around an engine. For example, an electrical raft may be lighter, for example significantly lighter, than a conventional harness required to transmit a given number of electrical signals. A plurality of conductors may be embedded in a single electrical raft, whereas in a conventional arrangement a large number of heavy, bulky wires, usually with insulating sleeves, would be required. The reduced weight may be particularly advantageous, for example, when used on gas turbine engines on aircraft.

Electrical rafts may be more easily packaged and/or more compact, for example than conventional harnesses. Indeed, as mentioned above, the electrical rafts can be made into a very wide range of shapes as desired. This may be achieved, for example, by manufacturing the electrical rafts using a mould conforming to the desired shape. As such, each electrical raft may be shaped, for example, to turn through a tighter corner (or smaller bend radius) than a conventional harness. The electrical rafts may thus provide a particularly compact solution for transferring electrical signals around a gas turbine engine. The electrical rafts may be readily shaped to conform to neighbouring components/regions of a gas turbine engine, for example components/regions to which the particular electrical raft assembly is attached, such as a fan casing or a core casing.

The electrical raft(s) may provide improved protection to the electrical conductors during manufacture/assembly of the raft/gas turbine installation, and/or during service/operation/maintenance of the gas turbine engine. This may result in lower maintenance costs, for example due to fewer damaged components requiring replacement/repair and/or due to the possibility of extending time intervals (or service intervals) between inspecting the electrical system, for example compared with a system using only conventional harnesses.

Any suitable material may be used for the rigid material of the electrical raft. For example, the rigid material may be a rigid composite material, for example an organic matrix composite. Such a rigid composite material may be particularly stiff and/or lightweight. Thus, a rigid composite raft may be used that has suitable mechanical properties, whilst being thin and lightweight, for example compared with some other materials. The rigid composite material may comprise any suitable combination of resin and fibre as desired for a particular application. For example, any of the resins and/or fibres described herein may be used to produce a rigid composite material for the electrical raft. Any suitable fibres may be used, for example carbon fibres, glass fibres, aramid fibres, and/or para-aramid fibres. The fibres may be of any type, such as woven and/or chopped. Any suitable resin may be used, for example epoxy, BMI (bismaleimide), PEEK (polyetheretherketone), PTFE (polytetraflouroethylene), PAEK (polyaryletherketone), polyurethane, and/or polyamides (such as nylon).

In any example of electrical raft or electrical raft assembly, at least one of the electrical conductors embedded in the electrical raft may be an electrically conductive wire. The or each electrically conductive wire may be surrounded by an electrically insulating sleeve.

At least some (for example a plurality) of the electrical conductors may be provided in a flexible printed circuit (FPC). Thus, at least some of the electrical conductors may be provided as electrically conductive tracks in a flexible substrate. The flexible printed circuit may be flexible before being embedded in the rigid material.

Providing the electrical conductors as tracks in a flexible printed circuit may allow the size of the resulting electrical raft to be reduced further and/or substantially minimized. For example, many different electrical conductors may be laid into a flexible printed circuit in close proximity, thereby providing a compact structure. The flexible substrate of a single flexible printed circuit may provide electrical and/or mechanical protection/isolation to a large number of electrical conductors.

Any given electrical raft may be provided with one or more electrical wires embedded therein (which may be sheathed) and/or one or more flexible printed circuits embedded therein. As such, a given electrical raft may have wires and flexible printed circuits laid therein.

It will be appreciated that the embedded electrical conductors (whether they are provided as embedded electrical wires or as conductive tracks in a flexible printed circuit embedded in the rigid material) may be described as being fixed in position by the rigid material, for example relative to the rest of the electrical harness raft. It will also be appreciated that the embedded electrical conductors may be said to be surrounded by the rigid material and/or buried in the rigid material and/or integral with (or integrated into) the rigid material.

The electrical raft (or electrical raft assembly) may be at least a part of an electrical harness for a gas turbine engine, and thus may be referred to herein as an electrical harness raft (or electrical harness raft assembly).

An electrical raft (or electrical raft assembly) may comprise a fluid passage. Such a fluid passage may be embedded therein and/or otherwise provided thereto. The fluid passage may be part of a fluid system, such as a gas (for example pneumatic or cooling gas/air) and/or liquid (for example a fuel, hydraulic and/or lubricant liquid).

There is also provided a method of assembling an electrical raft assembly and/or a gas turbine engine. The method comprises preparing an electrical raft assembly as described above and elsewhere herein. The method also comprises electrically and mechanically connecting the prepared electrical raft assembly to the rest of the apparatus/gas turbine engine.

Thus, there is provided a gas turbine engine or gas turbine engine installation (for example for an airframe) comprising an electrical raft and/or an electrical raft assembly as described above and elsewhere herein. For example, at least one electrical raft and/or electrical raft assembly may be used as part of an electrical harness for transferring electrical signals around the engine, in the form of electrical harness raft(s) and/or electrical harness raft assemblies.

The electrical raft may comprise one or more electrical connectors (which, as well as the type described above in relation to the first aspect, may be of other type) or sockets, which may be electrically connected to at least one of the embedded electrical conductors. The electrical connector or socket may allow electrical connection of the electrical raft to other electrical components, for example to other electrical rafts (either directly or indirectly, via an electrical cable or lead) or to electrical units (again, either directly or indirectly, via an electrical cable or lead). Such an electrical connector or socket may take any suitable form, and may be at least partially embedded in the rigid electrical raft.

The electrical raft assembly may be a first engine installation component, and the gas turbine engine may further comprise a second engine installation component having electrical conductors. The gas turbine engine may further comprise at least one flexible cable connected between the electrical raft assembly and the second engine installation component so as to electrically connect electrical conductors of the electrical raft assembly with electrical conductors of the second engine installation component.

The second engine installation component may be, for example, an ECU, such as an EMU or EEC. Additionally or alternatively, the second engine installation component may be a further electrical raft or electrical raft assembly.

The environment of a gas turbine engine during operation may be particularly severe, with, for example, high levels of vibration and/or differential expansion between components as the temperature changes through operation and as the components move relative to each other. Providing at least one flexible cable to connect an electrical raft assembly to another component may allow the electrical rafts and/or components to accommodate vibration and/or relative movement, for example of the component(s)/assemblies to which they are attached/mounted during use. For example, the flexible cable(s) (where present) used to electrically connect electrical raft assemblies to other component(s) may have sufficient length to accommodate such vibration and/or movement during use.

For example, providing separate (for example more than one) electrical raft assemblies and connecting at least some (for example at least two) of them together using at least one flexible cable may allow the electrical rafts to accommodate vibration and/or relative movement of the component(s)/assemblies to which they are attached/mounted during use.

The electrical signals transferred by the conductors in the electrical raft, and around the engine using the electrical rafts/raft assemblies may take any form. For example, the electrical signals may include, by way of non-limitative example, electrical power and/or electrical control/communication signals and/or any other type of transmission through an electrical conductor. Transmission of signals around the engine may mean transmission of signals between (to and/or from) any number of components/systems in the engine and/or components/system of a structure (such as an airframe) to which the gas turbine engine is (or is configured to be) connected/installed in. In other words, an electrical raft may be used to transfer/communicate any possible combination of electrical signals in any part of a gas turbine engine installation or a related (for example electrically and/or mechanically connected) structure/component/system.

An electrical raft or raft assembly may be provided in any suitable location/position of the gas turbine engine, for example to a mounting structure at any suitable location. For example, the gas turbine engine may comprise a bypass flow duct formed between an engine core and an engine fan casing (the gas turbine engine may be a turbofan engine, for example); and the electrical raft assembly may form at least a part of a radially extending splitter (which may be referred to as a bifurcation) that extends across the bypass flow duct. In this way, an electrical raft (which may be referred to as a splitter electrical raft) may provide an electrical connection between a fan casing and an engine core. By way of further example, the electrical raft assembly may be attached to the engine core case or engine fan case, for example to a mounting structure on such cases.

Other components/systems of a gas turbine engine may be provided to an electrical raft assembly in any suitable manner. For example, such other components/systems may be mounted on one or more electrical raft assemblies. Thus, a surface of an electrical harness raft may be used as a mounting surface for other gas turbine engine components/systems, such as ancillary/auxiliary components/systems.

For example, an electrical unit may be mounted on an electrical raft. The electrical unit may be any sort of electrical unit, for example one that may be provided to a gas turbine engine. For example, the electrical unit may be any type of electronic control unit (ECU), such as an Electronic Engine Controller (EEC) and an Engine Health Monitoring Unit (EMU). At least one (i.e. one or more) electrical unit may be attached to an electrical raft. Such an electrical raft assembly may be a particularly convenient, lightweight and/or compact way of providing (for example attaching, fixing or mounting) an electrical unit to a turbine engine. For example, the electrical unit and the electrical raft may be assembled together (mechanically and/or electrically) before being installed on the gas turbine engine, as described elsewhere herein.

An electrical raft may be provided with at least one mount on which other components (for example auxiliary/ancillary components/systems) of the gas turbine engine are (or may be) mounted. The mount may be a bracket, for example a bespoke bracket for the component/system mounted thereon or a conventional/standard bracket. The electrical raft may provide a stable, regular and convenient platform on which to mount the various systems/components. The combination of the installed electrical raft assembly with components/ systems mounted thereon may be much more compact and/or straightforward to assemble and/or have a greatly reduced number of component parts, for example compared with the corresponding conventional electrical harness and separately mounted components/systems.

The mounts may be used to attach any component/system to an electrical raft (and thus to the engine) as required. For example, fluid pipes for transferring fluid around the engine may be mounted to the electrical rafts (for example mechanically mounted using a bracket), and thus to the engine. More than one set of fluid pipes, for example for carrying different or the same fluids, may be mounted on the same electrical raft.

An anti-vibration mount may be used to attach an electrical raft to another component, thereby allowing the electrical raft to be vibration isolated (or at least substantially vibration isolated). Using an anti-vibration mount to attach an electrical raft/assembly to a gas turbine engine for example may reduce (or substantially eliminate) the amount (for example the amplitude and/or the number/range of frequencies) of vibration being passed to the electrical raft from the gas turbine engine, for example during use. This may help to prolong the life of the electrical raft. Furthermore, any other components that may be attached to the electrical raft (as discussed above and elsewhere herein) may also benefit from being mounted to the gas turbine engine via the anti-vibration mounts, through being mounted on the electrical raft. For example, the reduced vibration may help to preserve the electrical contact between the electrical raft and any electrical unit connected thereto. As such, any components (such as an electrical unit mounted to the electrical raft) that would conventionally be mounted directly to the gas turbine engine and require at least a degree of vibration isolation no longer require their own dedicated anti-vibration mount. Thus, the total number of anti-vibration mounts that are required to assemble an engine may be reduced. This may reduce the number of parts required and/or the time taken to assemble an engine or engine installation and/or reduce the total assembled weight and/or reduce the likelihood of errors occurring during assembly.

Furthermore, components that are conventionally mounted to an engine without anti-vibration mounts (for example because of the weight and/or cost penalty), but which are now mounted to an electrical raft (for example to a mounting surface of the electrical raft), may benefit from vibration isolation without any weight/cost/assembly time penalty. This may reduce the possibility of damage occurring to such components and/or increase their service life. Such components may include, for example, ignitor boxes (used to provide high voltage power to engine ignitors), and pressure sensors/switches, for example for fluid systems such as oil, air, fuel, pneumatics and/or hydraulics.

Further optional features of the invention are set out below.

BRIEF DESCRIPTION OF THE DRAWINGS

Embodiments of the invention will now be described by way of example with reference to the accompanying drawings in which.

DETAILED DESCRIPTION OF THE PREFERRED EMBODIMENTS

Figure 1:
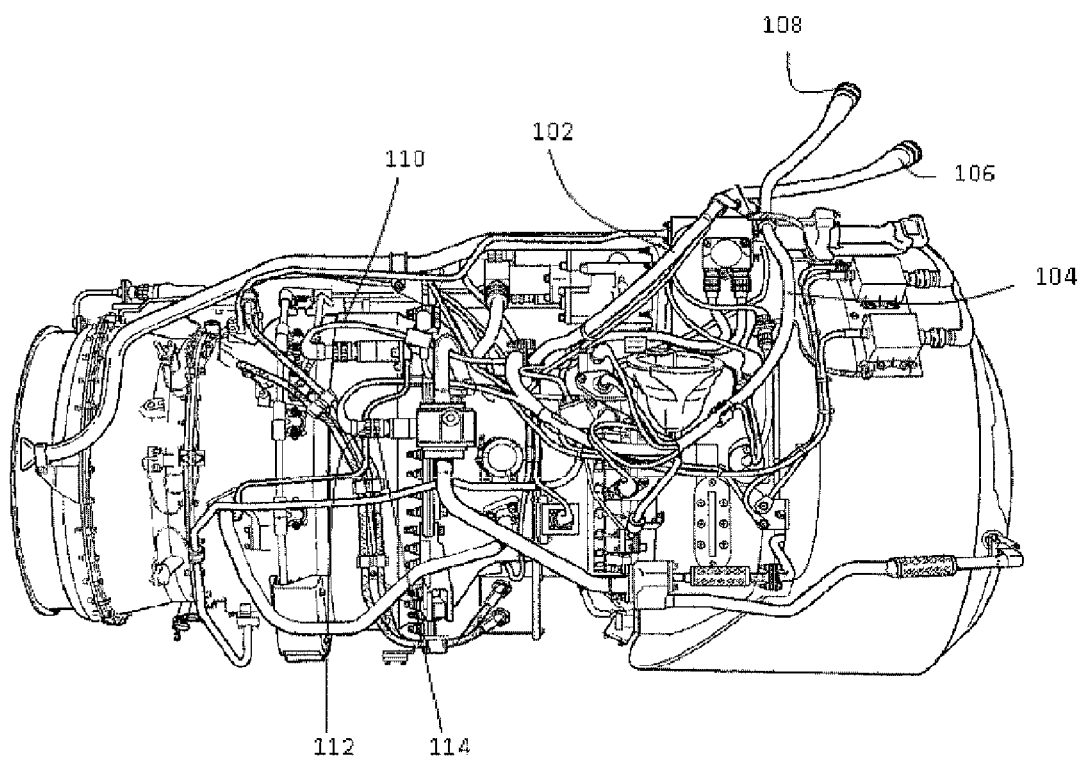
FIG. 1 shows a gas turbine engine with a conventional harness.
Figure 2:
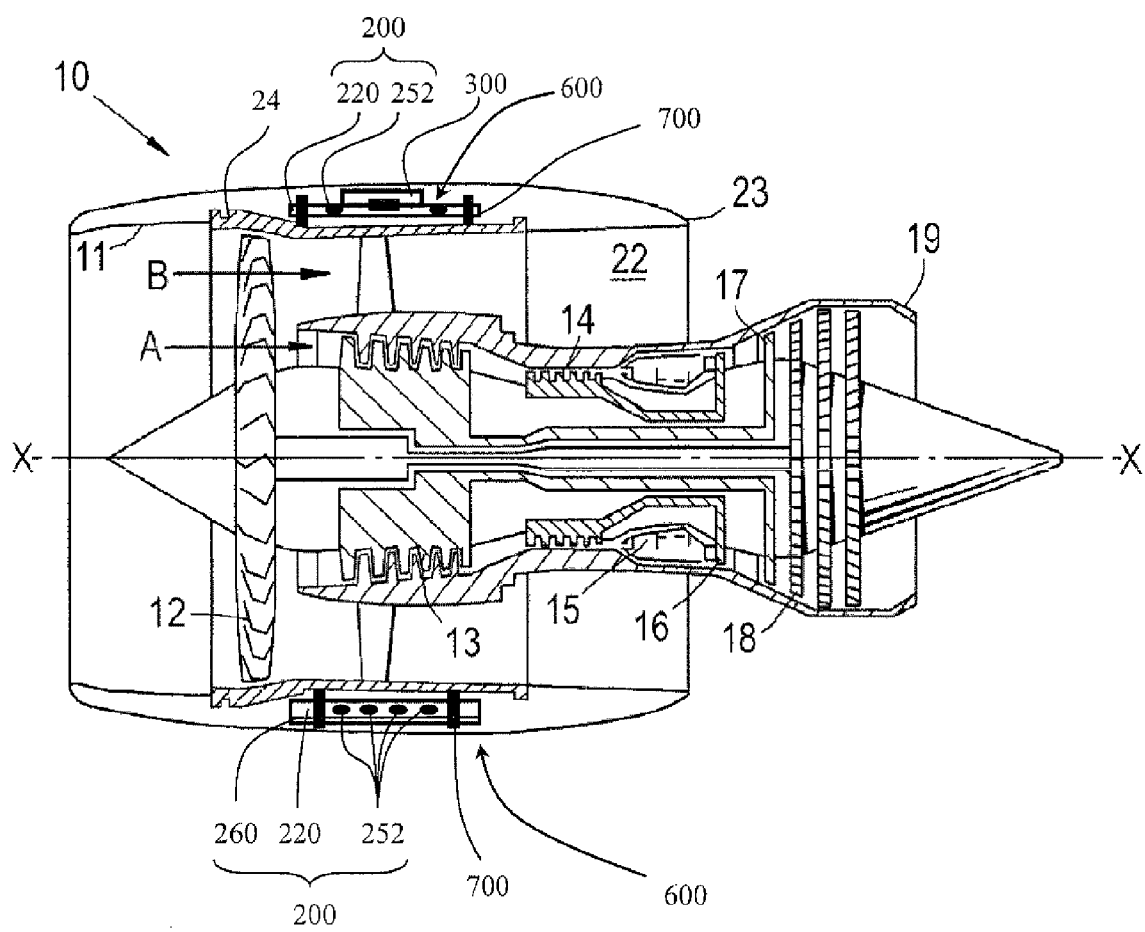
FIG. 2 shows a cross-section through a gas turbine engine in accordance with the present invention.

With reference to FIG. 2, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The gas turbine engine 10 shown in FIG. 2 shows two electrical raft assemblies 600 according to the invention. As such, the gas turbine engine 10 is in accordance with the present invention. Each electrical raft assembly 600 comprises an electrical raft 200. The electrical rafts 200 may be used to transmit/transfer electrical signals (or electricity, including electrical power and/or electrical control signals) around the engine and/or to/from the engine 10 from other components, such as components of an airframe. The function and/or construction of each electrical raft 200 and electrical raft assembly 600 may be as described above and elsewhere herein.

In FIG. 2, each electrical raft 200 (which may be referred to herein simply as a raft 200 or an electrical harness raft 200) comprises at least one electrical conductor 252 embedded in a rigid material 220, which may be a rigid composite material.

The electrical conductors 252 in the electrical raft 200 may be provided in a harness 250, which may be a flexible printed circuit board (or FPC) 250.

Figure 3:
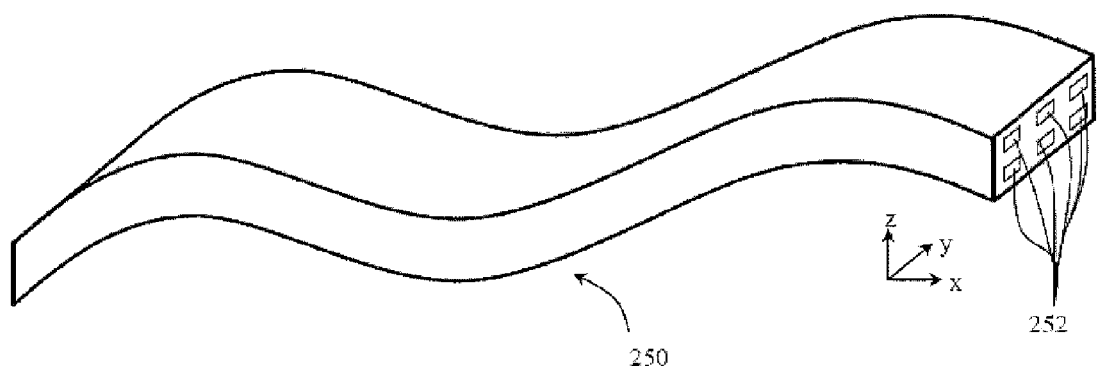
FIG. 3 shows a perspective view of a flexible printed circuit.
Figure 4:
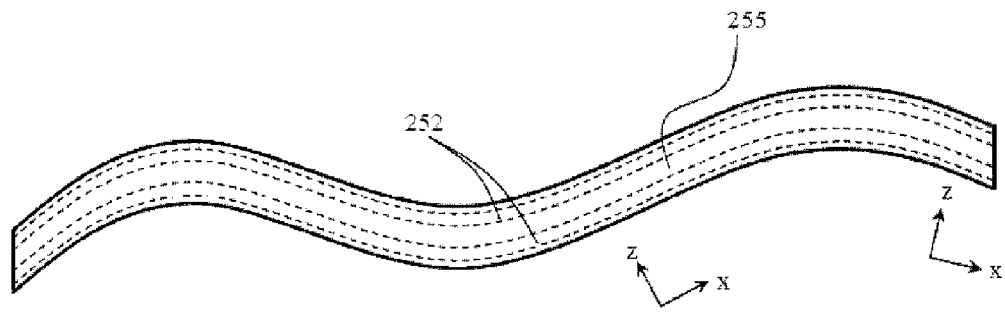
FIG. 4 shows a side view of the flexible printed circuit of FIG. 3.

An example of an FPC 250 in which the electrical conductors 252 may be provided is shown in greater detail in FIGS. 3 and 4. FIG. 3 shows a perspective view of the FPC 250, and FIG. 4 shows a side view.

Such an FPC 250 may comprise a flexible (for example elastically deformable) substrate 255 with conductive tracks 252 laid/formed therein. The FPC 250 may thus be deformable. The FPC 250 may be described as a thin, elongate member and/or as a sheet-like member. Such a thin, elongate member may have a major surface defined by a length and a width, and a thickness normal to the major surface. In the example shown in FIGS. 3 and 4, the FPC 250 may extend along a length in the x-direction, a width in the y-direction, and a thickness (or depth or height) in the z-direction. The x-direction may be defined as the axial direction of the FPC. Thus, the x-direction (and thus the z-direction) may change along the length of the FPC 250 as the FPC is deformed. This is illustrated in FIG. 4. The x-y surface(s) (i.e. the surfaces formed by the x and y directions) may be said to be the major surface(s) of the FPC 250. In the example shown in FIGS. 3 and 3, the FPC 250 is deformable at least in the z direction, i.e. in a direction perpendicular to the major surface. FPCs may be additionally of alternatively deformable about any other direction, and/or may be twisted about any one or more of the x, y, or z directions.

The flexible substrate 255 may be a dielectric. The substrate material may be, by way of example only, polyamide. As will be readily apparent, other suitable substrate material could alternatively be used.

The conductive tracks 252, which may be surrounded by the substrate 255, may be formed using any suitable conductive material, such as, by way of example only, copper, copper alloy, tin-plated copper (or tin-plated copper alloy), silver-plated copper (or silver-plated copper alloy), nickel-plated copper (or nickel-plated copper alloy) although other materials could alternatively be used. The conductive tracks 252 may be used to conduct/transfer electrical signals (including electrical power and electrical control signals) through the rigid raft assembly (or assemblies) 200, for example around a gas turbine engine 10 and/or to/from components of a gas turbine engine and/or an airframe attached to a gas turbine engine.

The size (for example the cross-sectional area) and/or the shape of the conductive tracks 252 may depend on the signal(s) to be transmitted through the particular conductive track 252. Thus, the shape and/or size of the individual conductive tracks 252 may or may not be uniform in a FPC 250.

The example shown in FIGS. 3 and 4 has six conductive tracks 252 running through the substrate 255. However, the number of conductive tracks 252 running through a substrate 255 could be fewer than six, or greater than six, for example tens or hundreds of tracks, as required. As such, many electrical signals and/or power transmission lines may be incorporated into a single FPC 250.

A single FPC 250 may comprise one layer of tracks, or more than one layer of tracks, for example, 2, 3, 4, 5, 6, 7, 8, 9, 10 or more than 10 layers of tracks. An FPC may comprise significantly more than 10 layers of tracks, for example at least an order of magnitude more layers of tracks. In this regard, a layer of tracks may be defined as being a series of tracks that extend in the same x-y surface. Thus, the example shown in FIGS. 3 and 4 comprises 2 layers of tracks, with each layer comprising 3 tracks 252.

An electrical raft 200 may be manufactured using any suitable method. For example, the rigid material 220 may initially be provided as layers of flexible material, such as (by way of example only) layers of fibre and resin compound. This flexible material may be placed into a mould, for example having a desired shape. Other components (such as fluid pipes 210 and/or the electrical conductors 252, which may be embedded in a FPC 250) may also be placed into the mould, for example between layers of the flexible material from which the rigid material 220 is ultimately formed. Parts of the mould may have any suitable form and/or construction, for example that could be readily removed when the electrical raft 200 is formed into the desired shape.

Figure 5:
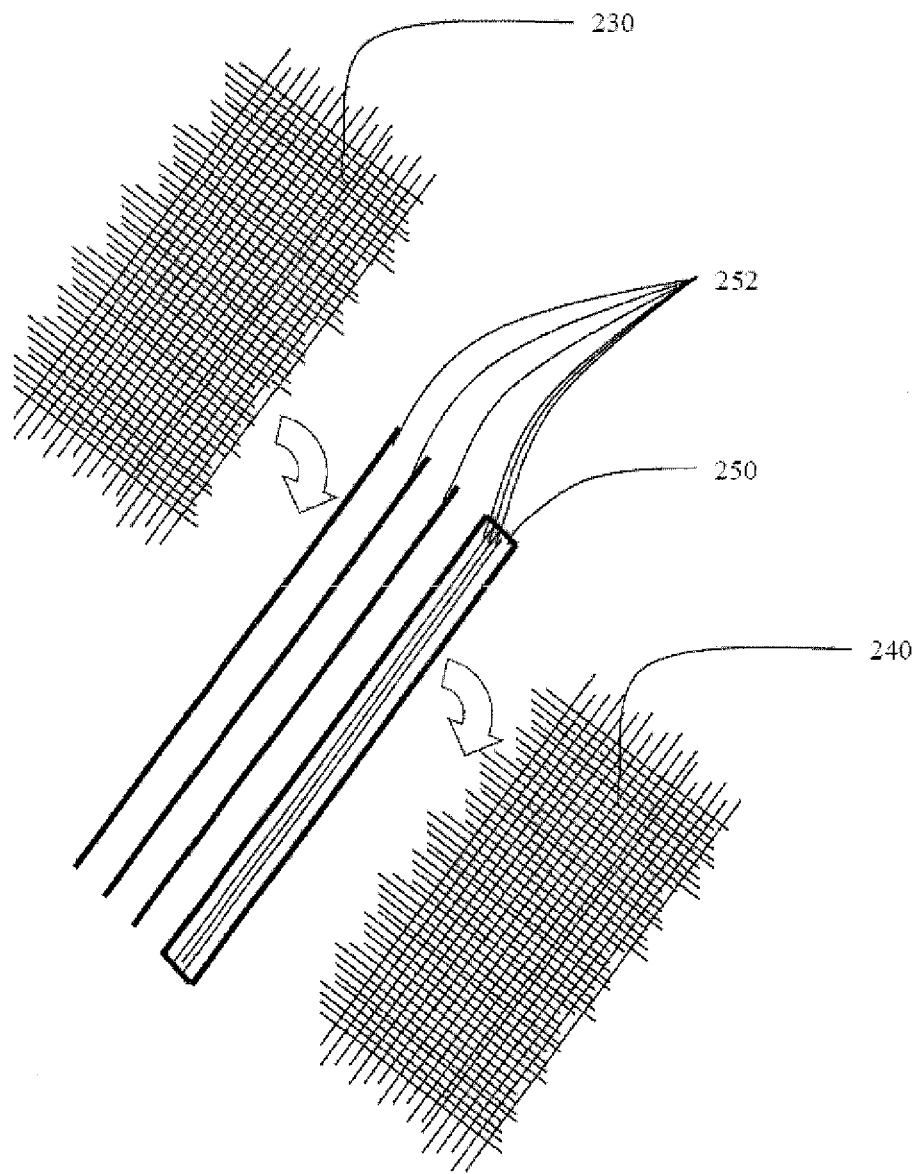
FIG. 5 shows a schematic of an electrical raft prior to assembly.

FIG. 5 shows components of an example of an electrical raft 200 prior to one method of construction. The electrical conductors 252 are provided between two layers of material 230, 240 that, after construction, form the rigid material 220. Some of the electrical conductors 252 are provided in an FPC 250. The material 230, 240 may be a fibre and resin compound, as described elsewhere herein. Such a fibre and resin compound may, after suitable treatment (for example heat treatment), produce the rigid composite material 220. In the example of FIG. 5, the fibre and resin compound is formed of a sheet of interwoven fibres, or strands. The strands in FIG. 5 extend in perpendicular directions, although the strands may extend in any one or more directions as required. The strands/fibres may be pre-impregnated (or "pre-pregged") with the resin.

Prior to any treatment, both the first and second layers 230, 240 and the electrical conductors 252 may be flexible, for example supple, pliable or malleable. As such, when the layers 230, 240 and the electrical conductors 252 are placed together, they may be moulded, or formed, into any desired shape. For example, the layers 230, 240 and the electrical conductors 252 may be placed into a mould (which may be of any suitable form, such as a glass or an aluminium mould) having the desired shape. The desired shape may be, for example, a shape that corresponds to (for example is offset from) a part of a gas turbine engine, such as, by way of example only, at least a part of a casing, such as an engine fan casing or engine core casing. This may enable the final raft to adopt shapes that are curved in two-dimensions or three-dimensions.

Any suitable method could be used to produce the electrical raft 200. For example, the strands/fibres need not be pre-impregnated with the resin. Instead, the fibres/strands could be put into position (for example relative to electrical conductors 252/FPC 250) in a dry state, and then the resin could be fed (or pumped) into the mould. Such a process may be referred to as a resin transfer method. In some constructions no fibre may be used at all in the rigid material 220.

Figure 6:
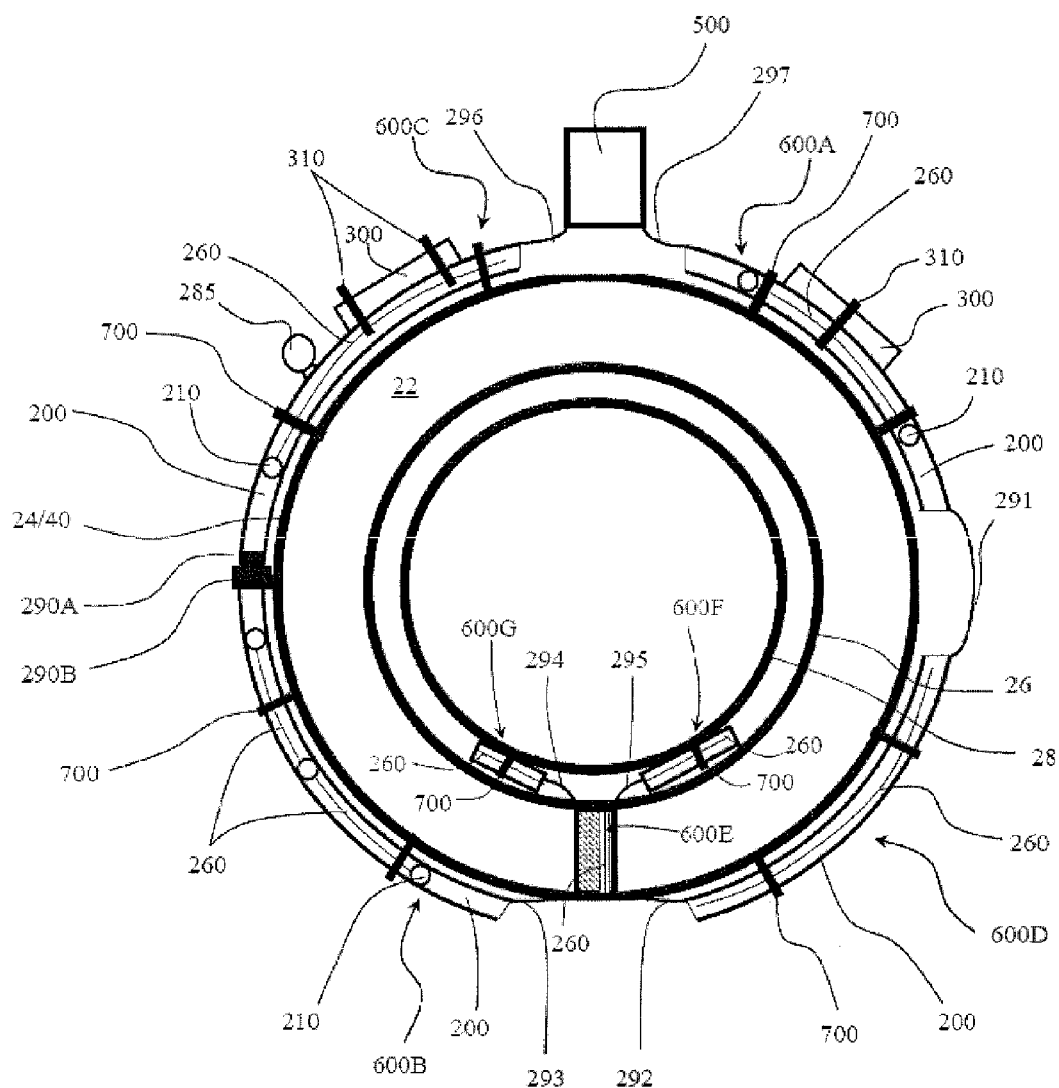
FIG. 6 shows a cross-section normal to the axial direction through a gas turbine engine in accordance with the present invention.

FIG. 6 is a schematic showing a cross-section perpendicular to the direction X-X of a gas turbine engine comprising electrical raft assemblies 600A-600G. Any one of the electrical raft assemblies 600A-600G may comprise any or all of the features of an electrical raft assembly 600 as described herein, for example. Thus, for example, any one of the electrical raft assemblies may comprise an electrical raft 200 (not labelled for raft assemblies 600E-600G for simplicity only) having electrical conductors 252 (not labelled in FIG. 6 for simplicity only) embedded therein. Some or all of the electrical raft assemblies 600A-600G (which may collectively be referred to as electrical raft assemblies 600) comprise a mounting fixture for attaching the respective assembly 600 to a mounting structure 700 (such as an anti-vibration mount).

The mounting structure is part of a fan case 24 for electrical raft assemblies 600A-600G, part of a bifurcation splitter that radially crosses a bypass duct 22 for electrical raft assemblies 600E and part of an engine core case 28 for electrical raft assemblies 600F and 600G. However, it will be appreciated that an electrical raft assembly 600 could be mounted in any suitable and/or desired location on a gas turbine engine.

In FIG. 6, two electrical raft assemblies 600A, 600C are shown as having an electrical unit 300 mounted on the respective electrical raft 200. However, any (or none) of the electrical raft assemblies 600A-600G may have an electrical unit 300 mounted to the respective electrical raft 200.

As mentioned herein, each of the electrical rafts 200 associated with the electrical raft assemblies 600A-600G shown in FIG. 6 comprises one or more electrical conductors 252 embedded therein. However, any one or more of the electrical rafts 200 may be replaced with a raft that does not comprise electrical conductors 252. Such a raft would not be an electrical raft 200, but may otherwise be as described elsewhere herein, for example it may be a rigid raft that may have components/systems (such as, by way of example only, fluid systems, such as pipes) mounted thereon and/or embedded therein. Thus, for example, a gas turbine engine in accordance with the present invention may have a combination of electrical rafts 200 and non-electrical rafts.

The arrangement of electrical raft assemblies 600A-600G shown in FIG. 6 is by way of example only. Alternative arrangements, for example in terms of number, size, shape and/or positioning, of electrical raft assemblies 600A-600G may be used. For example, there need not be seven electrical raft assemblies, the assemblies may or may not be connected together, and the rafts could be provided to (for example mounted on) any one or more components of the gas turbine engine. Purely by way of example only, connection between electrical raft assemblies 600A-600D mounted on the fan casing 24 to the electrical raft assemblies 600F, 600G mounted on the core casing 28 may be provided at least in part by means other than an additional electrical raft assembly 600E, for example using wire conductors with insulating sleeves. By way of further example, one or more electrical raft assemblies 600 may additionally or alternatively be provided to the nose cone, structural frames or elements within the engine (such as "A-frames"), the nacelle, the fan cowl doors, and/or any connector or mount between the gas turbine engine 10 and a connected structure (which may be at least a part of a structure in which the gas turbine engine 10 is installed), such as the pylon 500 between the gas turbine engine 10 and an airframe (not shown).

Any one or more of the electrical rafts of the electrical raft assemblies 600A-600G may have a fluid passage 210 embedded therein and/or provided thereto. The fluid passage 210 may be part of a fluid system, such as a gas (for example pneumatic or cooling gas/air) and/or liquid (for example a fuel, hydraulic and/or lubricant liquid). In the FIG. 6 example, three of the electrical rafts (of electrical raft assemblies 600A, 600B, 600C) comprise a fluid passage 210 at least partially embedded therein. The electrical raft of assembly 600C also has a fluid passage 285 (which may be for any fluid, such as those listed above in relation to embedded passage 210) mounted thereon. Such a mounted fluid passage 285 may be provided to any electrical raft, such as those of electrical raft assemblies 600A-600G shown in FIG. 6. The fluid passages 210, 285 shown in FIG. 6 may be oriented in an axial direction of the engine 10. However, fluid passages may be oriented in any direction, for example axial, radial, circumferential or a combination thereof.

Any of the electrical raft assemblies 600A-600G (or the respective electrical rafts 200 thereof) may have any combination of mechanical, electrical and/or fluid connections to one or more (for example 2, 3, 4, 5 or more than 5) other components/systems of the gas turbine engine 10 and/or the rest of the gas turbine engine 10. Examples of such connections are shown in FIG. 6, and described below, but other connectors may be used. For example, electrical raft assemblies 600 (and/or non-electrical rafts) may be connected together (or to other components) using any combination of electrical, fluid and/or mechanical connectors. Thus, any of the connections 290A/290B, 291-297 shown in FIG. 6 may be any combination of electrical, fluid and/or mechanical connection. Alternatively, electrical raft assemblies 600 (and/or non-electrical rafts) may be standalone, and thus may have no connection to other rafts or components.

A connection 291 is shown between the electrical rafts of the assemblies 600A and 600D. The connection 291 may comprise an electrical connection. Such an electrical connection may be flexible and may, for example, take the form of a flexible printed circuit such as the flexible printed circuit 250 shown in FIGS. 3 and 4. Such a flexible electrical connection may be used to electrically connect any electrical raft assembly 600 to any other component, such as another electrical raft assembly 600. A connection 297 (which may be or comprise an electrical connection) is provided between the electrical raft of the assembly 600A and a part of an airframe, or airframe installation 500, which may, for example, be a pylon. Similarly, a fluid and/or mechanical connection 296 may additionally or alternatively be provided between the airframe 500 and another electrical raft of the assembly 600C. As shown in FIG. 6, other electrical and/or fluid connections 292, 293, 294, 295 may be provided between electrical rafts 200 (or assemblies 600) and other components, such as other electrical rafts 200 (or assemblies 600).

A direct connection 290A, 290B may be provided, as shown for example between the electrical rafts of the assemblies 600B and 600C in the FIG. 6 arrangement. Such a direct connection 290A, 290B may comprise a connector 290A provided on (for example embedded in) one electrical raft 200 connected to a complimentary connector 290B provided on (for example embedded in) another electrical raft 200. Such a direct connection 290A, 290B may, for example, provide fluid and/or electrical connection between the two electrical rafts assemblies 600B, 600C.

An electrical raft 200 may have an electrically conductive grounding or screen layer 260, as shown in the electrical rafts 200 shown in FIG. 6 (and indeed in FIG. 2). However, it will be appreciated that electrical rafts 200 according to the invention and/or for use with the invention need not have such an electrically conductive grounding or screen layer 260. Where an electrically conductive grounding or screen layer 260 is present, an electrically conductive fastener 310 may be used to fasten, or fix, the electrical unit 300 (where present) to the electrical raft 200. This may allow the electrical unit 300 to be electrically grounded. It will also be appreciated, however, that electrical rafts 200 according to the invention and/or for use with the invention need not have such an electrically conductive fastener 310.

Where reference is made herein to a gas turbine engine, it will be appreciated that this term may include a gas turbine engine/gas turbine engine installation and optionally any peripheral components to which the gas turbine engine may be connected to or interact with and/or any connections/interfaces with surrounding components, which may include, for example, an airframe and/or components thereof. Such connections with an airframe, which are encompassed by the term "gas turbine engine" as used herein, include, but are not limited to, pylons and mountings and their respective connections. The gas turbine engine itself may be any type of gas turbine engine, including, but not limited to, a turbofan (bypass) gas turbine engine, turbojet, turboprop, ramjet, scramjet or open rotor gas turbine engine, and for any application, for example aircraft, industrial, and marine application. Electrical raft assemblies 600 such as any of those described and/or claimed herein may be used as part of any apparatus, such as any vehicle, including land, sea, air and space vehicles, such as motor vehicles (including cars and busses), trains, boats, submarines, aircraft (including aeroplanes and helicopters) and spacecraft (including satellites and launch vehicles).

It will be appreciated that many alternative configurations and/or arrangements of electrical raft assemblies 600 and gas turbine engines 10 comprising electrical raft assemblies 600 other than those described herein may fall within the scope of the invention. For example, alternative arrangements of electrical raft assemblies 600 (for example in terms of the arrangement, including number/shape/positioning/constructions, of mounting fixtures, the arrangement/shape/positioning/construction of the electrical rafts 200, the type and/or positioning of components (if any) mounted to/embedded in the electrical rafts 200, the rigid material 220 and the electrical conductors 252) may fall within the scope of the invention and may be readily apparent to the skilled person from the disclosure provided herein. Alternative arrangements of connections (for example mechanical, electrical and/or fluid) between the electrical (or non-electrical) rafts and/or raft assemblies and between the electrical (or non-electrical) rafts or raft assemblies and other components may fall within the scope of the invention and may be readily apparent to the skilled person from the disclosure provided herein. Furthermore, any feature described and/or claimed herein may be combined with any other compatible feature described in relation to the same or another embodiment.

Figure 7:
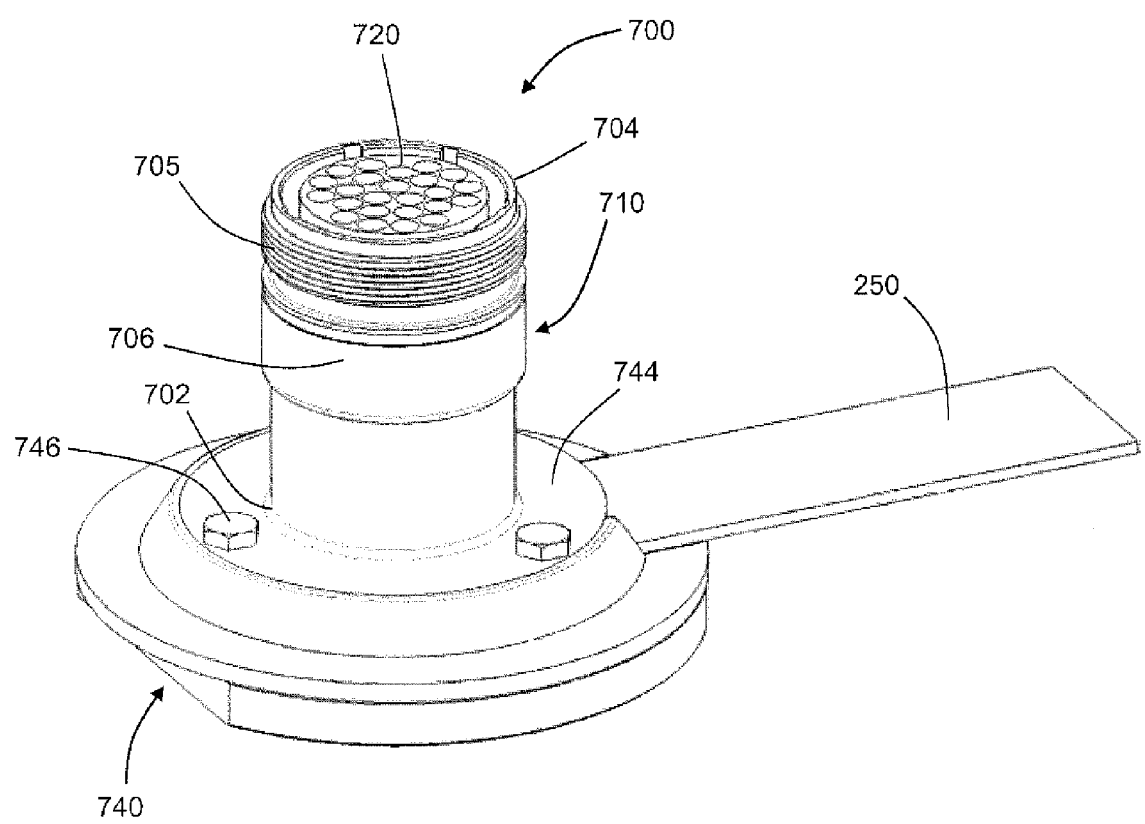
FIG. 7 shows a perspective view of a connector.
Figure 8:
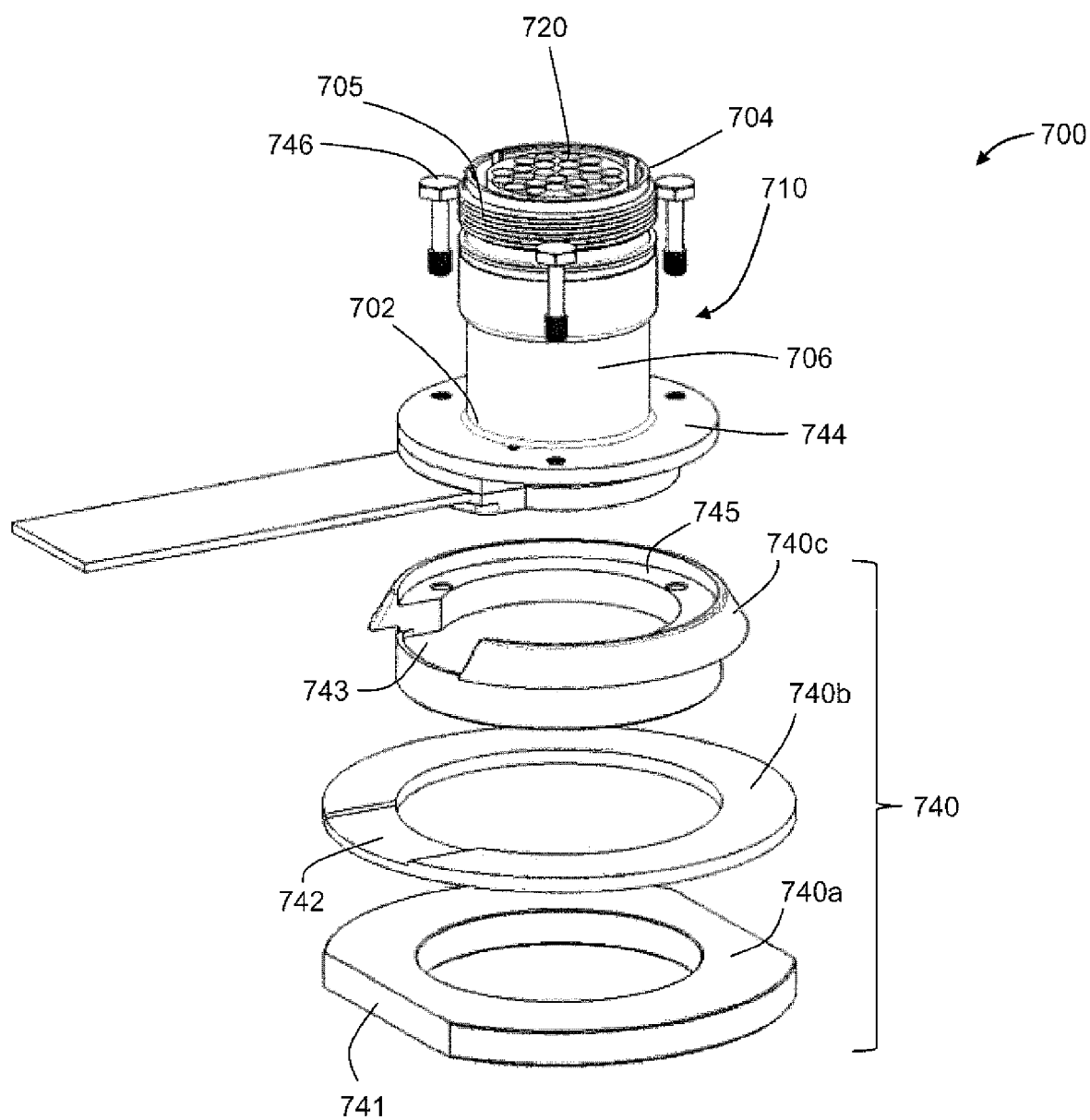
FIG. 8 shows an exploded view of the connector of FIG. 7.
Figure 9:
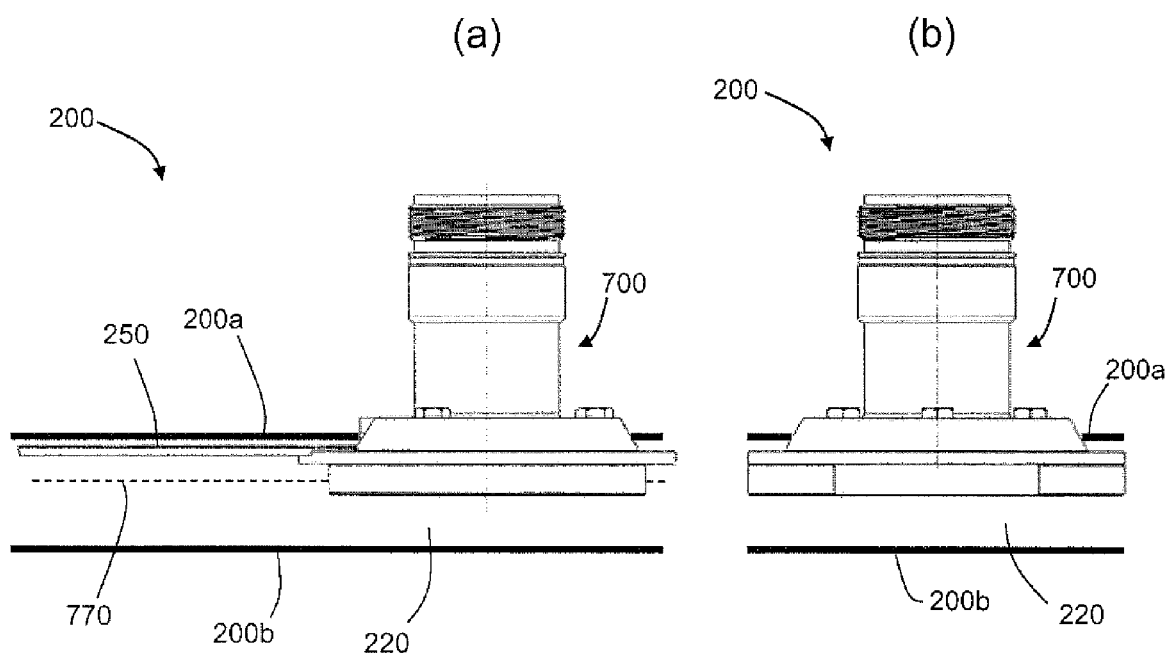
FIG. 9 shows (a) side and (b) end views of the connector of FIG. 7 located in an electrical raft.

The electrical rafts may have electrical connectors for making connections to their electrical conductors, and thereby electrically connecting the rafts with other rafts or electrical units. FIGS. 7 and 8 show respectively perspective and exploded views of such a connector 700, and FIG. 9 shows (a) side and (b) end views of the connector 700 located in the rigid composite material 220 of an electrical raft 200. Electrical conductors 252 in the form of one or more FPCs 250 are embedded in the raft 200 and extend substantially parallel to first 200a and second 200b major surfaces of the raft.

As shown in FIG. 9(a) the electrical raft 200 may also comprise an earthing mesh 770. The earthing mesh 770 may provide electrical screening to the electrical conductors 252 embedded in the raft. The earthing mesh may be embedded in the composite structure (for example it may be provided during manufacture).

The electrical connector 700 has a connector body 710 including a housing 706, a first set of electrical contacts (not shown in FIGS. 7 to 9, but discussed below in relation to FIGS. 10 and 11), and a second set of electrical contacts 720. The housing 706 may contain internal components of the electrical connector 700, such as internal electrical connections (not shown). The housing 706 has a first end 702 and a second end 704, which may be opposite to each other. The first set of electrical contacts is formed at the first end 702. The second set of electrical contacts 720 is formed at the second end 704. The second end 704 is accessible from outside the electrical raft 200.

The embedded electrical conductors 252 are electrically connected to the electrical connector 700 through the first set of electrical contacts. These may take any suitable form, but are disconnectable from the electrical conductors 252, as discussed in more detail below in relation to FIGS. 10 and 11.

The second set of electrical contacts 720 may also take any suitable form, and may be e.g. as male or female connectors. The second set of electrical contacts 720 electrically connects the electrical connector 700, and thus the conductors 252 in the electrical raft 200, to a further electrical component (not shown).

In the example of FIGS. 7 to 9, the second set of electrical contacts 720 are male pins accommodated in a socket formed by the second end 704 of the housing 706 and the complimentary set of contacts are female pins (not shown) accommodated in a plug of the further electrical component. Separate mechanical connectors (not shown) may be provided to hold, or lock, the electrical connector 700 and the further electrical component together, e.g. a locking ring may thread onto thread 705 formed around the second end 704.

The further electrical component may take any suitable form. For example, the further electrical component may comprise a set of electrical conductors, such as an FPC, and/or one or more wires, which may be sheathed and/or bundled together. The set of electrical conductors may be used, for example, to connect the electrical raft 200 to another electrical component, which may be, for example, another electrical raft 200 or an ECU, such as an EEC or EMU.

Alternatively, as mentioned elsewhere herein, the further electrical component may be any type of electrical component. For example, the further electrical component may be an electrical unit, or ECU, such as an EEC or an EMU. Thus, the further electrical component may be an electrical unit, which may be connected to the electrical raft 200, for example directly connected to the second set of electrical contacts 720 using the set of complimentary electrical contacts.

The electrical connector 700 also has a back-shell 740 which encloses the first end 702 of the housing 706. As best shown in FIG. 8, the back-shell 740 in the example shown has a base portion 740a, a flange portion 740b, and a mounting portion 740c for the connector body 701. The flange portion 740*b* and the mounting portion 740*c* both have central through-holes, while the base portion 740*a* has a central blind-hole. The portions are nested with the holes in alignment, and with the flange portion 740*b* sandwiched between the base portion 740*a* and the mounting portion 740*c*. The mounting portion 740*c* has a threaded lower half which screws onto corresponding threaded formed in the blind-hole of the base portion 740*a* to hold the nested portions together. The earthing mesh 770, where present, may be secured between the nested portions.

The back-shell 740 is embedded in the rigid material 220 with the mounting portion 740*c* at the first major surface 200*a* of the raft 200. The aligned holes of the back-shell produce a recess accessible from the major surface 200*a* into which the connector body 710 can be mounted. In this way, the back-shell 740 defines the position of the connector 700 relative to the raft 200, and can provide sealing against ingress of fluids (such as water, oil and fuel) into the connector 700 during use.

Elastomeric seals (not shown) may be provided between the components of the back-shell 740 and/or between the back-shell and the connector body 710 to improve the sealing between these components.

The housing 706 and the back-shell 740 may be electrically conductive and may be in electrical contact with each other to provide electro-magnetic shielding of the connector 700. For example, the housing and the back-shell can be formed of metal. However another option is to form the housing and the back-shell of conductive or plated composite, plastic or ceramic.

To manufacture the electrical raft 200, the electrical conductors 252 (e.g. in the form of one or more FPCs 250) may be provided between fibre reinforcement layers that are impregnated with and joined together by a polymer matrix (i.e. resin). Preferably, the back-shell 740 is embedded in this composite material 220 before the polymer matrix is cured or set, e.g. as part of a laying up process of the electrical conductors 252 and reinforcement layers, or before injection moulding of the composite material around the electrical conductors 252 and back-shell 740. In this way, the back-shell 740 can be integrated with the raft 200.

As shown in the Figures, the back-shell may comprise one or more location features. In particular, the base portion 740*a* and the flange portion 740*b* extend radially outwardly beyond the mounting portion 740*c* and prevent the back-shell from being pulled out of the raft 200 through the first major surface 200*a*. Further, the base portion 740*a* has flats 741 which prevent the back-shell from rotating in the raft.

Figure 10:
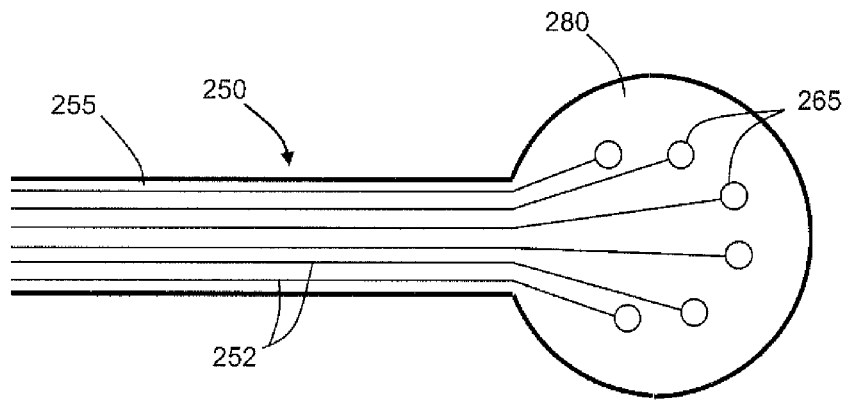
FIG. 10 shows schematically a plan view of a lollipop connector of a flexible printed circuit board.
Figure 11:
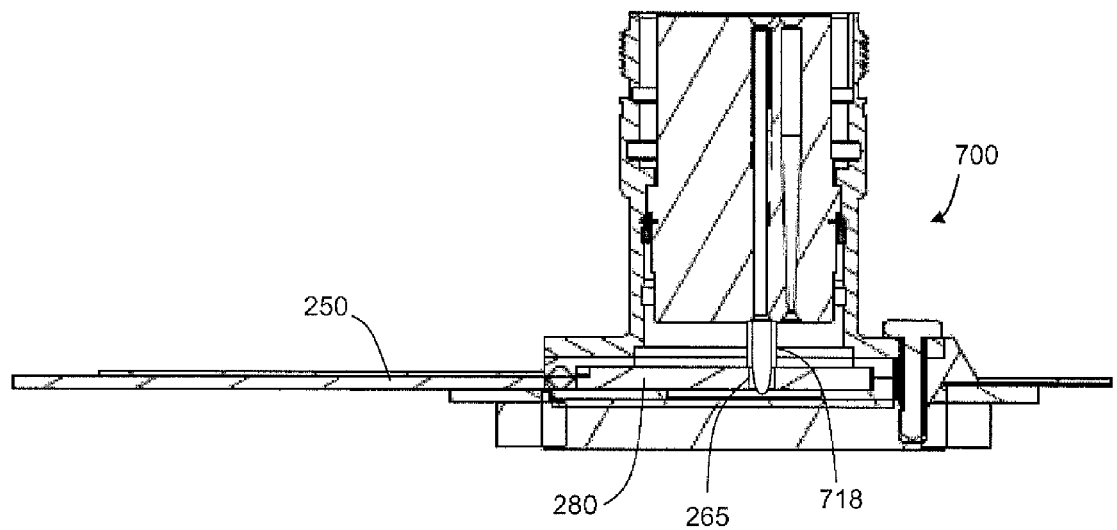
FIG. 11 shows schematically a cross-section of the connector of FIG. 7 connected to the lollipop connector of FIG. 10.

As shown in FIG. 10, an FPC 250 for connection to the connector 700 has electrical conductors 252 which are in the form of tracks in a flexible substrate 255. The substrate terminates in a dedicated connector 280, which is then connected to the first set of electrical contacts of the connector 700. Such a dedicated connector 280, which may be referred to as a lollipop connector, comprises openings 265. Each opening 265 is formed at the end of a respective track 252 of the FPC 250. The openings 265 are internally plated with an electrically conductive layer and are configured to receive the first set of electrical contacts. For example the first set of electrical contacts may comprise pins 718 (as shown in FIG. 11), each of which is received in a respective opening 265. The lollipop connector 280 may be substantially rigid such that it maintains its shape under operating and/or manufacture loads. This may be achieved, for example, by reinforcing the dedicated connector with a rigid material.

On manufacture of the electrical raft 200, the back-shell 740 and the FPC 250 may be arranged such that the lollipop connector 280 is situated in the recess of the back-shell. The flange portion 740*b* has a side channel 742 and the mounting portion 740*c* has a side entry-hole 743 that allow the FPC 250 to enter through the side of the back-shell 740. Fixing screws or other fasteners (not shown) may be used to retain the lollipop connector 280 in position in the back-shell 740.

To mount the connector body 710 to the back-shell 740, the first end 702 of the housing 706 is presented to the recess of the back-shell 740 such that the first set of electrical contacts 718 insert into the openings 265 of the lollipop connector 280. A flange 744 around the first end 702 locates the housing 706 in a corresponding groove 745 formed in the outwardly-facing side of the mounting portion 740*c*. A plurality of bolts 746 distributed around the flange 744, and accessible from outside the raft 200, then secure the connector body 710 and the back-shell 740 together. Conveniently, the press fit connection of the first set of electrical contacts 718 into the openings 265 avoids permanent joining (e.g. by soldering or mechanical crimping).

To detach the connector body 710 from the raft 200, it is a simple matter to undo the screws 746 and pull the connector body away from the raft so that the first set of electrical contacts 718 withdraw from the openings 265. If fasteners are used to retain the lollipop connector 280 in position in the back-shell 740, these can help to resist any frictional forces tending to also pull the lollipop connector out of the back-shell. The detached connector body 710 can be replaced, upgraded, repaired etc. as needed.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

We claim:

1. An electrical raft comprising:
   a rigid material having multiple electrical conductors embedded therein, and
   an electrical connector having a connector body including a first set of electrical contacts connected to at least one of the electrical conductors, a second set of electrical contacts for electrical connection to another component, and a housing having a first end and a second end, the first set of electrical contacts being at the first end, the second set of electrical contacts being at the second end, and the second end being accessible from outside the electrical raft, thereby allowing the electrical raft to be electrically connected to said other component;
   wherein:
   the electrical connector further has a back-shell which is embedded in the rigid material and which joins to the connector body to enclose the first end of the housing, and
   the connector body is detachable from the back-shell to disconnect the first set of electrical contacts from the electrical conductors and allow removal of the connector body from the electrical raft.

2. An electrical raft according to claim 1, wherein the rigid material is a rigid polymer matrix composite material.

3. An electrical raft according to claim 1, wherein the connector body is joined to the back-shell by fasteners that are accessible from outside the electrical raft.

4. An electrical raft according to claim 1, wherein the back-shell has one or more location formations that prevent movement of the back-shell relative to the rigid material.

5. An electrical raft according to claim 1, wherein the housing and the back-shell are electrically conductive and are in electrical contact with each other to provide electromagnetic shielding of the connector.

6. An electrical raft according to claim 1, wherein:
at least some of the electrical conductors are provided in a flexible printed circuit in the form of electrical tracks formed in a flexible substrate,
the electrical tracks terminate in openings in a flexible printed circuit connector, and
the first set of electrical contacts comprise pins that are received in respective openings so as to electrically connect the electrical tracks to the electrical connector.

7. An electrical raft according to claim 1, further comprising an electrically conductive screen layer.

8. An electrical raft assembly comprising:
an electrical raft comprising a rigid material having multiple electrical conductors embedded therein, and an electrical connector having a connector body including a first set of electrical contacts connected to at least one of the electrical conductors, a second set of electrical contacts for electrical connection to another component, and a housing having a first end and a second end, the first set of electrical contacts being at the first end, the second set of electrical contacts being at the second end, and the second end being accessible from outside the electrical raft, thereby allowing the electrical raft to be electrically connected to said other component;
wherein:
the electrical connector further has a back-shell which is embedded in the rigid material and which joins to the connector body to enclose the first end of the housing, and
the connector body is detachable from the back-shell to disconnect the first set of electrical contacts from the electrical conductors and allow removal of the connector body from the electrical raft, and
a further electrical component comprising a complimentary set of electrical contacts that correspond to the second set of electrical contacts, wherein
the electrical raft and the further electrical component are in electrical connection through the second set of electrical contacts and the complimentary set of electrical contacts.

9. A gas turbine engine or gas turbine engine installation, having an electrical raft, the electrical raft comprising a rigid material having multiple electrical conductors embedded therein, and an electrical connector having a connector body including a first set of electrical contacts connected to at least one of the electrical conductors, a second set of electrical contacts for electrical connection to another component, and a housing having a first end and a second end, the first set of electrical contacts being at the first end, the second set of electrical contacts being at the second end, and the second end being accessible from outside the electrical raft, thereby allowing the electrical raft to be electrically connected to said other component;
wherein:
the electrical connector further has a back-shell which is embedded in the rigid material and which joins to the connector body to enclose the first end of the housing, and
the connector body is detachable from the back-shell to disconnect the first set of electrical contacts from the electrical conductors and allow removal of the connector body from the electrical raft.

10. A gas turbine engine or gas turbine engine installation according to claim 9, wherein:
the electrical raft is a first engine installation component,
the gas turbine engine or gas turbine engine installation further comprises a second engine installation component having electrical conductors, and
at least one flexible cable connects between the electrical raft and the second engine installation component so as to electrically connect electrical conductors of the electrical raft with electrical conductors of the second engine installation component.

* * * * *